United States Patent [19]

Rackett et al.

[11] 3,863,852

[45] Feb. 4, 1975

[54] CONTINUOUS LOOP FILM CARTRIDGE AND DRIVE MECHANISM

[76] Inventors: Gerald F. Rackett, 13543 Moorepark St, Sherman Oaks, Calif. 91403; Ralph Sacks, Hilton Office Center, 900 Wilshire Blvd., Suite 1134, Los Angeles, Calif. 90017

[22] Filed: Mar. 13, 1972

[21] Appl. No.: 233,957

Related U.S. Application Data

[63] Continuation-in-part of Ser. No. 64,372, Aug. 17, 1970, abandoned.

[52] U.S. Cl. ........................ 242/55.19 R, 242/75.51

[51] Int. Cl. ............................................ B65h 17/48

[58] Field of Search... 242/55.19 R, 55.19 A, 75.51; 352/128

[56] References Cited

UNITED STATES PATENTS

| | | | |
|---|---|---|---|
| 2,706,629 | 4/1955 | Cailliot | 242/55.19 R |
| 2,875,667 | 3/1959 | Chedister | 242/55.19 R |
| 2,940,753 | 6/1960 | Nygaard | 242/55.19 R |
| 3,045,937 | 7/1962 | Johnson | 242/75.51 X |
| 3,304,019 | 2/1967 | Myers | 242/55.19 A |
| 3,326,484 | 6/1967 | Yefsky | 242/55.19 A |
| 3,424,392 | 1/1969 | Di Veto et al. | 242/75.51 X |

*Primary Examiner*—Billy S. Taylor
*Attorney, Agent, or Firm*—Lyon & Lyon

[57] ABSTRACT

A feeding and driving mechanism useful either for a motion picture film or magnetic tape wherein the film or tape is joined end to end to form a continuous loop. The mechanism includes a cartridge having a flat turntable upon which the film is formed in a relatively loose coil and from which it is fed to any conventional projecting or playing means running at any desired speed, and from which the film is returned to the outside of the coil on the turntable. The film is ejected from the center of the coil by driven rotation of the turntable. The turntable is driven by a motor the signal to which is derived from a motor speed control circuit which is actuated in response to the size of the loop in the film between the center of the coil and the projector gate, whereby the speed of the motor is varied. Friction is applied to the edges of the film coil, particularly toward the center of the coil, so as to decrease the tension between adjacent convolutions of film which substantially loosens the convolutions at the center of the coil. The motor speed control circuit provides rapid, broad range control over the speed of the turntable so that adjacent convolutions of film slide over one another as they travel toward the center of the coil, the friction between convolutions and between the film and the turntable continuously compensating for differences in tangential velocity between the center and the outside of the coil.

14 Claims, 9 Drawing Figures

INVENTORS.
GERALD F. RACKETT
RALPH SACKS
BY Lyon & Lyon
ATTORNEYS

CONTINUOUS LOOP FILM CARTRIDGE AND DRIVE MECHANISM

BACKGROUND OF THE INVENTION

This is a continuation in part of our U.S. Pat. application filed Aug. 17, 1970, Ser. No. 64,372, and now abandoned.

Numerous devices have been proposed in the past for providing an efficient and effective means for projecting an endless loop of film or tape but such devices have not been operable except when using relatively short loops. Because of inadequate control over the disposition of the coil, breakage is a frequent occurrence as the coil becomes jammed up inside the cartridge. As a result, the devices heretofore opposed have been severely limited in the length of material which they can accommodate. Control devices heretofore proposed include those disclosed in U.S. Pat. Nos. to Stevens, 3,420,462, Chedister, 2,875,667 and Cailliot, 2,706,629. The systems disclosed in these patents include a drive mechanism and some type of control system which regulates the drive mechanism. Some of the control mechanisms are purely mechanical whereas others are both mechanical and electrical. The mechanical control systems are limited in the size of coil they can accommodate because they do not provide an adequate range of control to accommodate changes occuring in the coil during the take up of material on the exterior of the coil. In the electrically controlled mechanisms, variation of the torque of the motor renders the drive mechanism essentially incapable of sufficiently rapid response. Many of the references also teach that friction between adjacent convolutions of the film or tape is detrimental and should be avoided. In all devices of the present type rapid and continuous control over the drive mechanism is necessary because as the film is taken up on the exterior of the coil tension in the take-up span exerts a compressive force on the exterior of the coil and tends to build up compression between the convolutions at the center, and they become so tight that they will not feed out properly. All of the presently known systems pull the film out of the center of the coil which increases compression between the convolutions.

SUMMARY OF THE INVENTION

We have solved the aforementioned problems in the projection of continuous loop films or tapes and have achieved the heretofore unattained result of providing a mechanism which can accommodate lengths of film as long as 4 to 5 thousand feet, a length sufficient for a feature length film of 2 hours duration. While a length of 6,000 feet has sucessfully been projected continuously with the present invention, the upper limit is not presently known. In the ensuing discussion we will refer to the use of the invention as applied to motion picture film, but it will be apparent that magnetic sound or video tapes and the like are usable as well. We have found that one of the prime considerations, in order to handle large quantities of film, is to substantially eliminate compression of the central convolutions. The film is coiled upon a turntable having a flat continuous surface, with a central hub attached thereto which rotates with the turntable. The size of the central hub is varied in proportion to the expected size of the film coil. The turntable is driven by a motor of relatively high torque and equipped with a fly wheel to smooth out changes in speed. The driving of the turntable ejects the film from the center of the film coil where it is fed past a loop sensing mechanism and then to a projector of conventional configuration.

The projector is the sole determining factor as to the speed at which the film is taken from and returned to the film cartridge and the cartridge and its control mechanism are fully adapted to accommodate the projector to supply film to it at any conventional speed. Film is returned from the projector to the exterior of the coil. At the point where the returning film joins the coil on the turntable, the tangential velocity of the turntable exceeds the velocity of the returning film so that tension is maintained in the returning strip between the film coil and the last projector sprocket. This tension is, of course, exerted upon the rest of the film in the coil and the component of that tension force is directed radially inwardly toward the center of the coil exerting a compressive force upon all of the coil. Between the film coil and the turntable there is provided a layer of material which has a low coefficient of friction. A cover plate which extends over the film coil has a plurality of strips of material which engage the top surface of the coil to impose a friction load throughout the coil right up to the center.

The motor control mechanism includes an arm which is responsive to the size of a loop formed in the film between the center of the coil and the first sprocket of the projector, the size of this loop varying in response to the relative freedom of the central convolutions of film. The control arm actuates a motor speed control circuit which controls the electrical signal to the drive motor in a manner which varies the speed of the drive motor but does not appreciably decrease its torque at low speeds so that the starting torque to the turntable at low speeds will be fairly high and the responsve time fast. In actual operation, the turntable never stops and is typically capable of varying between a speed of 400 to 4,000 r.p.m.. Gaps or open spaces between some of the convolutions of film typically occur and tend to migrate from the center of the coil outwardly as the film slides over itself and internally adjusts for the decrease in tension toward the center coils. The film exits at the center of the coil traveling upwardly in its initial path at an angle of approximately 45° which appears to be a path which accommodates the ejection of the film from the coil in the most efficient manner particularly for wide film. Thinner film such as 8 mm or small magnetic tape can be ejected at much lower angles. After clearing the coil of film, the directional path of the film can be changed to accommodate the physical location of the cartridge. As previously mentioned, the control of the speed of the turntable is essentially independent of the projection speed of the projector.

It is an object therefore of the present invention to provide an improved mechanism for continously conveying an endless loop of film or tape.

More specifically, it is an object of the present invention to provide a mechanism for handling an endless loop of strip-like material through the means of a motor speed control circuit which continuously varies the speed at which the strip is ejected from the center coil, wherein the coil of material is disposed upon a flat turntable and wherein means are provided for frictionally engaging the coil of film in a manner which substantially loosens the central convolutions of the material so that they are free to exit from the surface of the turntable.

It is a specific object of the present invention to provide a storage and delivery mechanism for motion picture films of substantial length capable of operating without jamming up or breaking the film and which can respond to any normally used film projection speed. Further objects and advantages of the present invention will become apparent upon reading the following detailed description.

DESCRIPTION OF THE PREFERRED EMBODIMENT

Figures 5, 6:
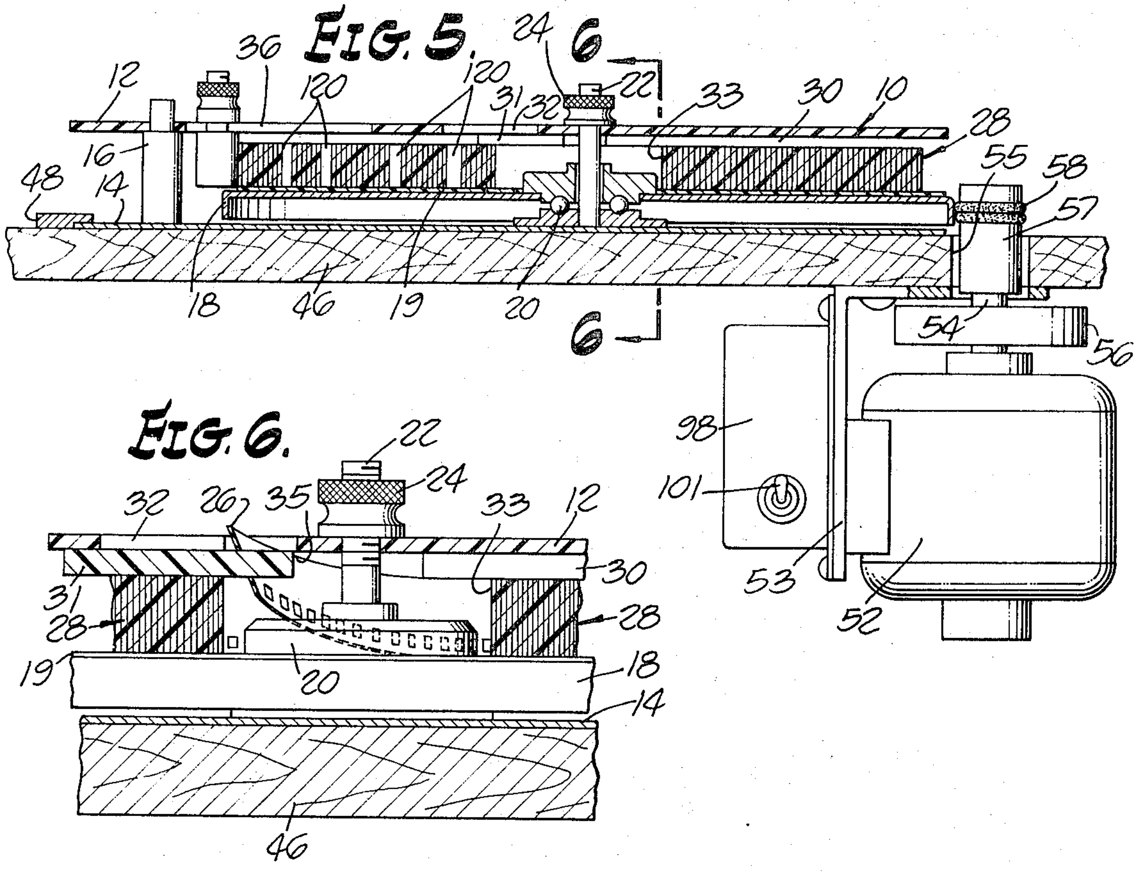
FIG. 5 is a sectional elevation of the film housing taken along line 5—5 of FIG. 3.
FIG. 6 is a partial sectional elevation taken along line 6—6 of FIG. 5.
Figure 7:
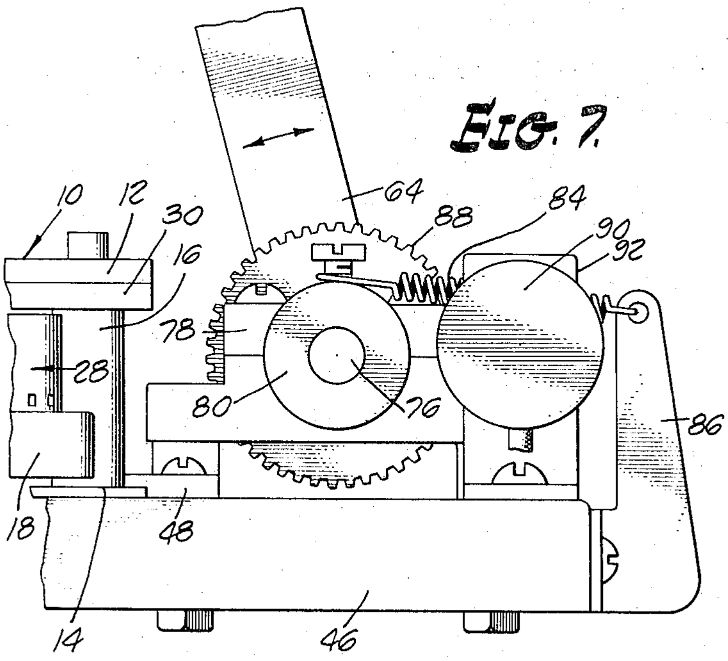
FIG. 7 is an enlarged partial elevation showing the details of the control actuating mechanism.

The film housing itself, as distinguished from the related portions of the mechanism and the projector used in accompaniment therewith, is generally designated 10 in the drawings. It consists of a top plate 12 and a bottom plate 14 which are mounted in a spaced relationship by a plurality of spacers 16. In the center of the housing, a turntable 18 is mounted upon suitable bearings 20, through which there is a center shaft 22 and a top plate retaining fastener 24. The turntable surface is flat and uniformly continuous with no opening or ridges to interfere with film migration toward the center. The major portion of the strip of material to be stored in the housing which may be either motion picture film or magnetic tape, is stored in a large coil 28 disposed upon the flat surface of turntable 18. Between the coil 28 and the turntable 18 is a layer of material 19, affixed to the turntable having a surface with a low coefficient of friction, such as Teflon. On the underside of top plate 12 are situated a number of strips 30 disposed in radial fashion, the purpose of which is to bear downwardly upon the edges of the various convolutions of the coil 28 to keep the coil flat on the turntable and to control film slippage to dissipate the inwardly directed component of force imposed by the tension in the returning portion of film which joins the film coil at the outer periphery thereof. Fastener 24 is adjusted so as to press the strips 30 downwardly upon the coil of film to impose the degree of friction thereon as desired. A slot 32 is provided in top plate 12 extending from a point near the center of rotation of the turntable to one side thereof. Slot 32 permits the film section 26 to exit from the center 33 of the coil. In so doing, portion 31 of the one guide strip 30 provides a surface over which the film 26 leaves the center of the coil. As can be seen in FIG. 6, the film makes a partial turn in coming out of the center of the coil so that one edge rides upon edge 35 of strip portion 31. The top plate 12 is further provided with a plurality of radially disposed slots 36 in which are situated depending guide rollers 38. Rollers 38 are adjustably affixed in the slots 36 by means of threaded studs 40 and fasteners 42. The positions of the guide rollers 38 are adjusted depending upon the outer dimension of the film coil so as to provide a means for maintaining the outer peripheral dimension of the coil 28 so that it does not overrun the outer dimension of turntable 18 but permitting some degree of looseness between convolutions of film.

Figures 1, 2:
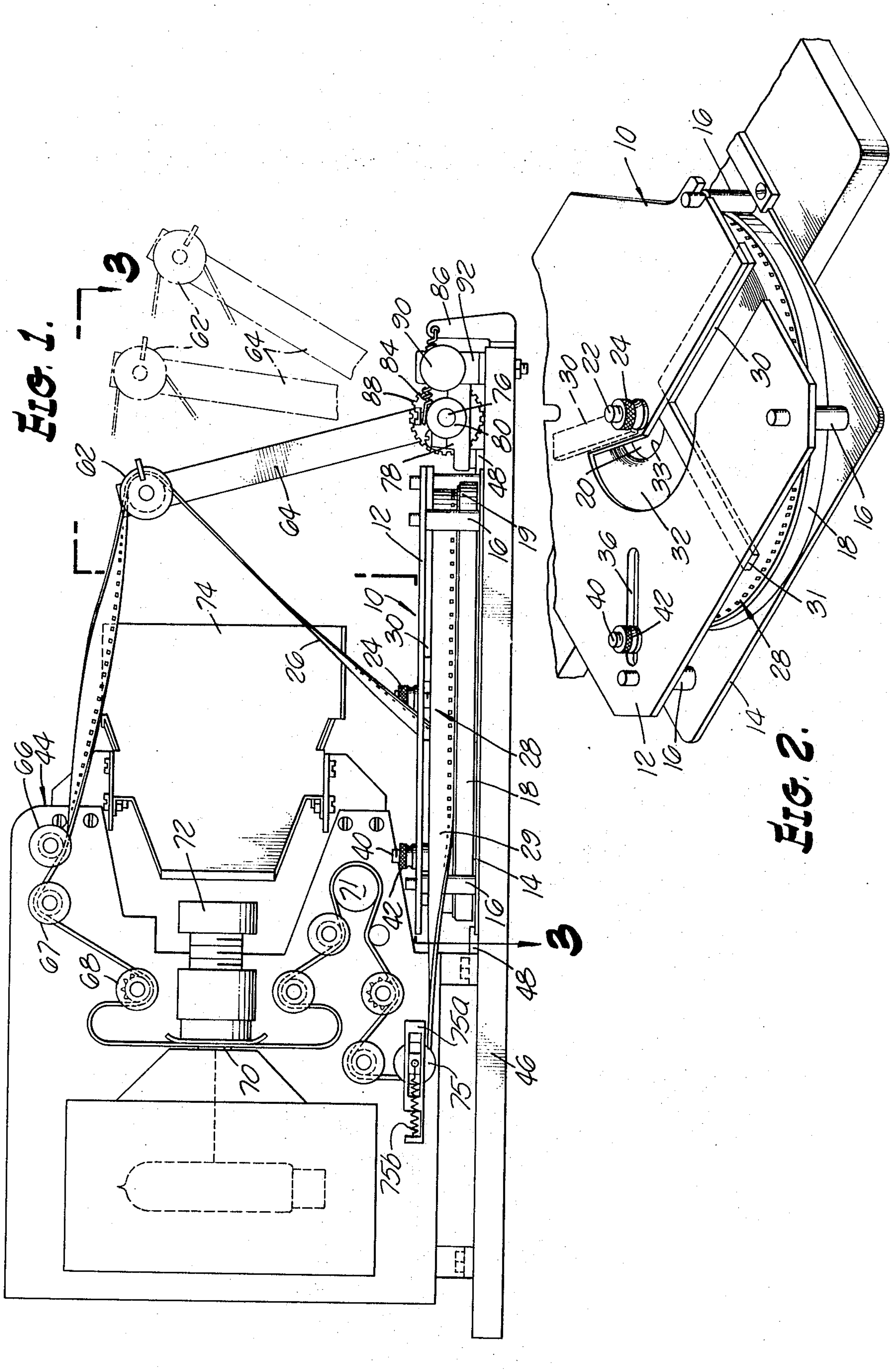
FIG. 1 is a side elevation of the film handling mechanism in conjunction with a conventional projector.
FIG. 2 is a partial perspective view of the film storage housing.

The film housing and drive mechanism of the present invention is adapted to be used with a conventional projector such as that shown in FIG. 1 at 44. Projector 44 may be mounted upon a large base plate 46 of a size sufficient to accommodate the film housing 10. The base plate 46 should include means for removably fastening the housing in proper position thereon. This may include guide plates 48 fastened to the base plate 46 and retaining latches 50. Other housing mounting and fastening devices may be used and the foregoing are only exemplary. Mounted below the base plate 46 is a motor 52 the drive shaft 54 of which includes a fly wheel 56 and a frictional drive capstan 57. In the embodiment shown in the drawings, the capstan 57 has a pair of O-rings 58 resiliently mounted on the end of capstan 57. Drive motor 52 is mounted to the bottom of base plate 46 by a suitable bracket 53 and is so positioned that the drive shaft 54 extends through an aperture 55 in the base plate situated in such position that capstan 57 will engage the periphery of turntable 18. The drive motor drives the turntable in a counterclockwise direction if one is viewing FIG. 3 so that the film is taken up at point 60 on the outer periphery of the coil 28. Of course, it is contemplated that instead of a capstan drive to the periphery of the turntable, a direct drive to the center of the turntable may be used, depending on the speed and torque ranges of available motors, or by gearing down higher speed motors. In such instances the flywheel may be eliminated as the turntable itself will fulfill that function.

Figure 4:
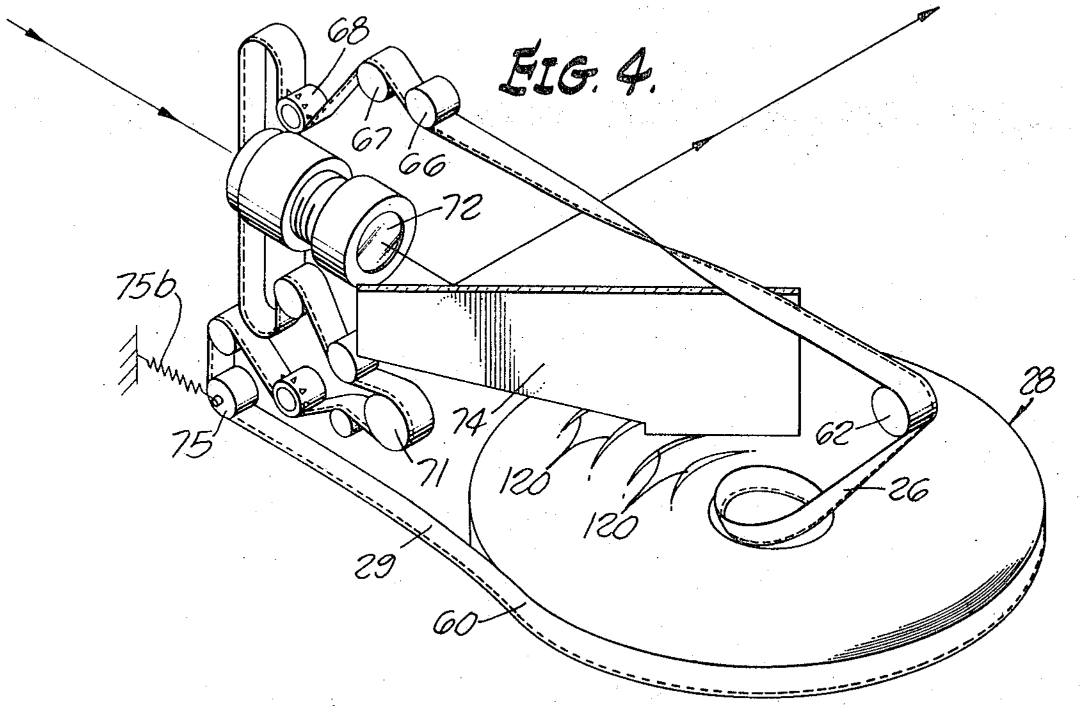
FIG. 4 is a diagrammatic perspective view showing the path of travel of the film.

As shown in FIGS. 1 and 4, the film 26 feeds out of the center of the coil and extends up and forwardly at an angle between 35° and 55° where it passes over a roller 62 which is mounted on the end of a control arm 64 the function of which will be more fully described subsequently. For wider film strips such as 16 mm or 35 mm, this angle is found to be best for free ejection from the center. Thinner film such as 8mm or small magnetic tapes can use a much lower exit angle. After passing over roller 62, the film threads into projector 44 by passing over rollers 66, 67, sprocket 68 and into the projector gate 70. After leaving the gate 70 the film is fed over a series of additional rollers in a conventional manner passing over the sound head 71 and then back to the film coil 28. In passing from roller 62 to roller 66, the film takes a twist inverting a full 180° in order to present the proper side of the film to the projector.

Figure 3:
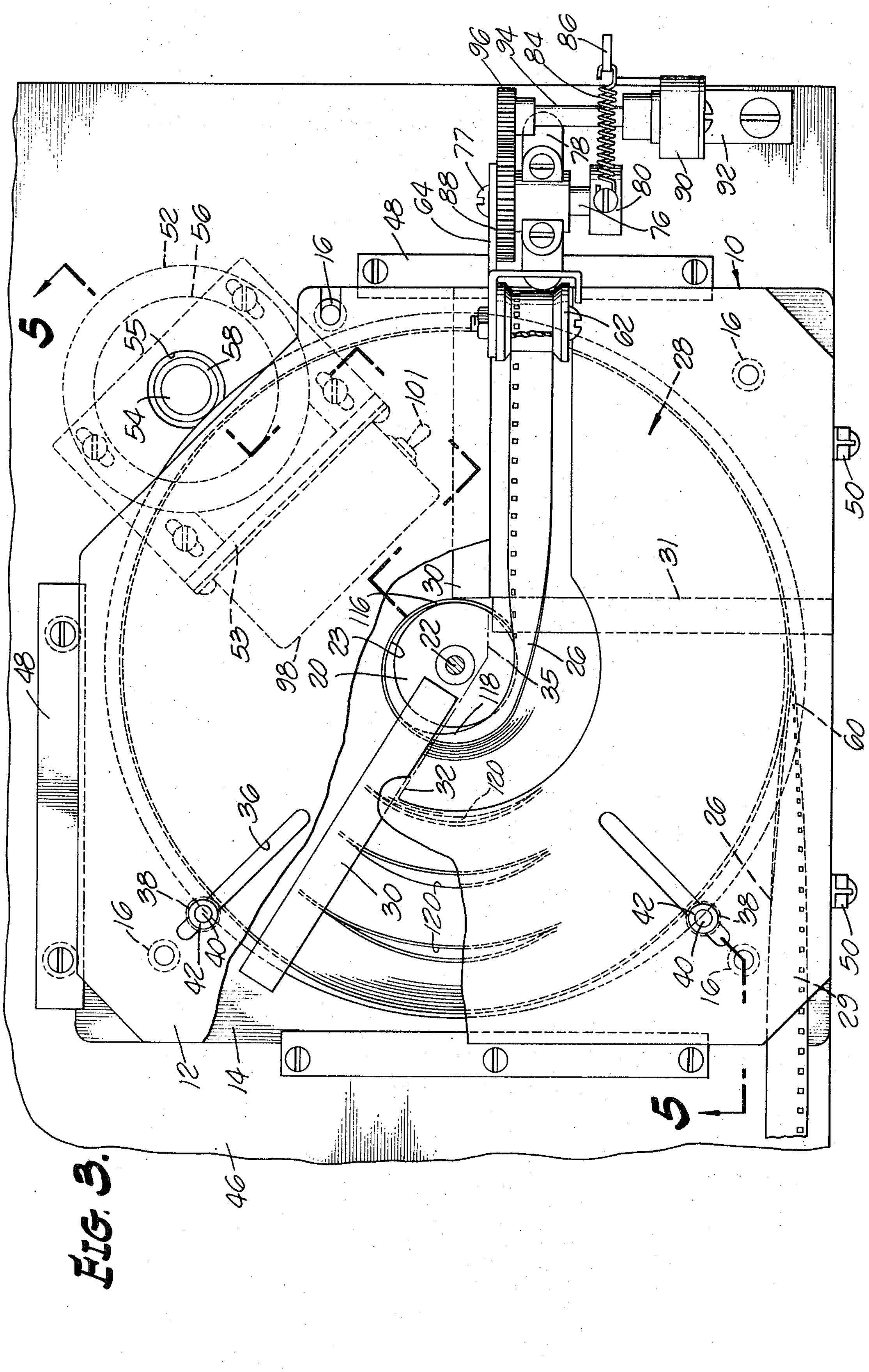
FIG. 3 is a partially sectional plan view taken along line 3—3 FIG. 1.

The section of film returning to the coil 28, designated 29 in FIGS. 1, 3 and 4, passes from the final roller 75 of the projector to the coil where it meets the coil at point 60. As previously mentioned, the turntable will always be rotating faster than the film coil, even at point 60, with the result that film section 29 will be under tension. The tension imposed in this section exerts a force upon the film coil which pulls the coil to a position whereby the geometric center of the coil does not coincide with the center of rotation of the turntable. The coil is pulled over so that the inner convolutions are in contact with the hub 20 in the area of point 116 (see FIG. 3) and spaced away from the hub in the area of point 118. In the space at 118 the inner two or three convolutions become free of compressive forces so that the strip section 26 leading out of the coil comes out freely without binding or excessive friction and in fact is actually pushed out of the coil rather than being pulled out as is the case with prior systems. The section 26 forming the loop is quite loose and responds quickly to the demands of the projector.

While the projector using the features of this invention to project a continuous loop film may employ entirely conventional projection apparatus such as the conventional front throw projector, the compactness of the mechanism suggests the utilization of the projection system using a short throw, wide angle lens in a 90° projection system. In FIGS. 1 and 4, such an arrangement is shown utilizing a wide angle lens 72 and a mirror 74. The mirror 74 is situated at a 45° angle and when the image is reflected from mirror 74 it is reversed. The projection system can be placed behind a projection screen for back lighting the same which then re-inverts the image. This permits the use of a projection system of this type as close as 3 feet behind the back-lighted screen to obtain an image which normally takes a projection throw of about 20 feet.

Turning now to the speed control mechanism, control arm 64 is affixed at its lower end to a cross shaft 76 to which it is secured by fastener 77. Cross shaft 76 is suitably journaled in a bearing block 78 which is mounted on the base plate 46. Attached to the other end of shaft 76 is a member 80 having a threaded fastener 82 threaded therein and engaging the end of shaft 76. To the fastener 82 is attached a return spring 84, the other end of said spring being attached to a bracket 86 secured to base plate 46. Also secured to shaft 76 and rotatable therewith is a large spur gear 88. A potentiometer 90 is mounted to the base plate by means of a suitable bracket 92 and the wiper shaft 94 of potentiometer 90 is fitted with a spur gear 96 in meshing relationship with gear 88. Thus, it will be apparent that when there is a variation in the size of the loop between the center of the coil and the first take-up wheel 66 of the projector, the control arm 64 will be caused to pivot about cross shaft 76 as shown in phantom lines in FIG. 1. This will cause a rotation of the wiper shaft 94 of potentiometer 90 varying the circuit resistance thereof.

Figure 9:
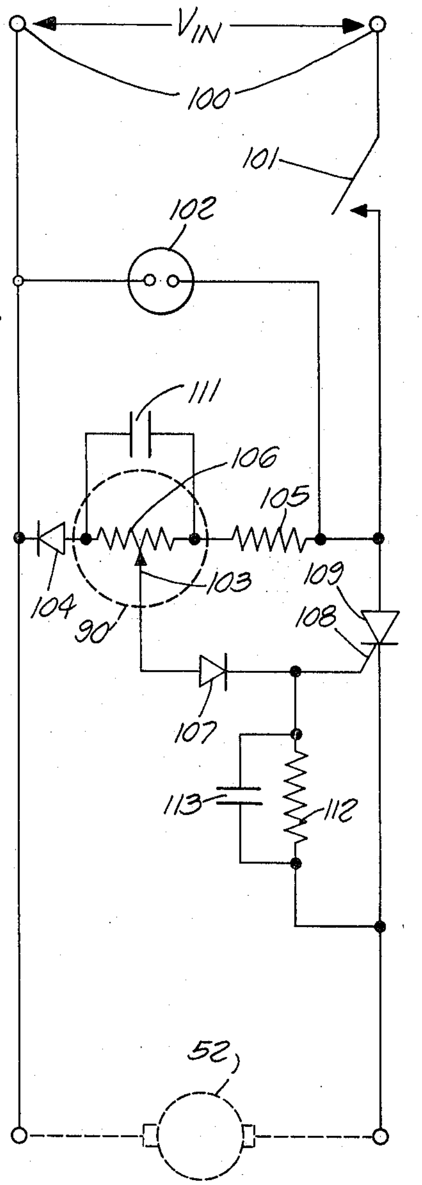
FIG. 9 is a schematic circuit diagram of the motor control circuit.
Figure 8:
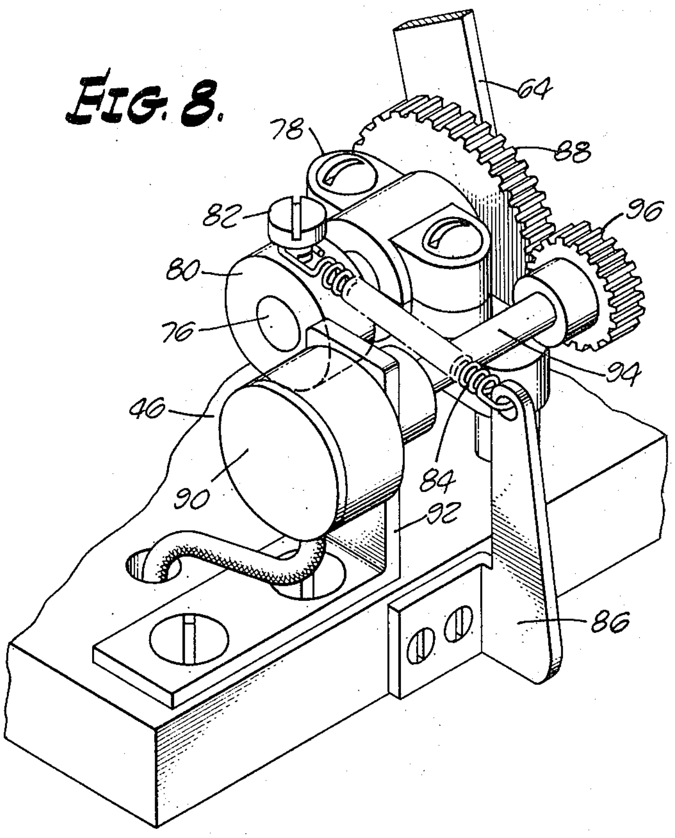
FIG. 8 is a partial perspective view of the control actuating mechanism.

Referring to FIG. 9, the schematic diagram shows the placement of potentiometer 90 in the motor control ciruit. The remainder of this motor control circuit may be situated in a control box 98 which may be mounted upon bracket 53. The voltage input to terminals 100 is conventional AC line voltage, 120 volts, 60 cycles. When switch 101 is closed neon bulb 102 will be caused to glow indicating that the power is on. For operation on the conventional 120 volt AC lines, motor 52 should have a nominal voltage of around 80 volts at full speed. The circuit shown employs the residual back EMF of the motor with a circuit-generated reference voltage referenced between the wiper 103 of potentiometer 90 and the cathode of diode 104. Due to diode 104, current flows through resistor 105 and the resistance 106 of potentiometer 90 only during the positive half cycle. If the back EMF from the motor is greater than the maximum value of the half sine wave, (a condition indicating that the motor is going faster than its selected speed) then diode 107 will be reverse biased and the voltage on gate electrode 108 of silicon-controlled rectifier 109 will not gate the SCR and thus no power will be supplied to the motor during that half cycle. This will cause the motor slow down and consequently its back EMF will drop. As the back EMF becomes slightly less than the reference voltage established by the setting of wiper arm 103 in potentiometer 90, then current will flow through diode 107 triggering the SCR which will then cause the SCR to conduct and supply additional power to the motor 52. The point at which the SCR is triggered is obviously altered by changing the magnitude of the reference voltage which is done by adjusting potentiometer 90. Capacitor 111 is inserted across the resistance 106 to reduce hunting effect so that the smallest increment of power is provided to the motor just sufficient to compensate for the motor energy lost per cycle. The effect of capacitor 111 is to delay the latest possible triggering point and thereby give the smallest increment of power to the motor. Additionally, the result of the capacitor 111 is to reduce the amount of change in voltage applied. This is because as the triggering point becomes later, the change in voltage becomes smaller. The RC circuit consisting of resistor 112 and capacitor 113 is provided only to control the time constant characteristic of the back EMF signal. The speed control provided by this circuit gives a very wide range of control, which is infinitely variable and provides from zero to full speed, but without substantially reducing the torque of the motor at lower speeds. Thus, the speed of the turntable can be smoothly varied under operating conditions so that film will be fed out of the coil as demanded by the projector.

As previously stated, the turntable is driven at a rotational speed in excess of that at which the outer periphery of the film coil is actually turning. It will be obvious that there is a difference in tangential velocity between the film coming from the center of the coil and that being taken up on the periphery thereof. Since the film is coiled loosely on the turntable, it will migrate freely toward the center of the coil as film is ejected from the coil center. As the film migrates along the surface of the turntable toward the center of the coil, the film is allowed to slide over itself and the friction strips 30 control the film slippage to dissipate the effects of the tension which otherwise tend to compress the inner convolutions together. Film slippage varies because of variations in surface friction and edge friction which are not evenly distributed along the length of the film but rather may become bunched up in places causing some of the coils of film to separate and leave gaps such as those designated at 120 in FIGS. 4 and 5. These gaps occur at the center near point 118 as the apparent result of nonuniform distribution of surface friction as well as the force exerted on the coil at 60, and migrate outward as the film is pulled toward the center. When the gaps reach the outside, roller guides 38 smooth them out and keep the outer periphery of the coil on the turntable. These gaps seem to facilitate the free migration of film to the center without undue tension. It should be remembered that film projection speed is entirely independent of the turntable speed, and is determined entirely by the speed of the projector gate 70.

Variations in the slippage rate, and particularly the gaps 120 when they reach the outer periphery of the coil will affect the tension in film section 29, and thus affect the force exerted on the coil. To alleviate this and keep the force relatively constant roller 75 on the projector may be mounted in a guide track 75*a* biased by a spring 75*b*. Alternatively, other spring loaded tension control means may be used on section 29 instead of altering the mechanism of the projector.

As previously mentioned, the center hub size is varied according to the size of the film coil to be used. This may be calculated by the following equation:

$$S = Do - Di/2t \times \pi Di + \pi Do/2 = (Do^2 - Di^2)\pi/4t$$

where $S$ = film length in inches

Do, Di = coil and hub diameter in inches, respectively and $t$ = film thickness in inches.

For example, if the hub were 2.5 inches and the coil were 10 inches in diameter, such a coil would accommodate 12,271.8 inches or 1022.7 feet, normal running time 26 minutes.

We have previously pointed out that as the film migrates toward the center of the coil, it slips over itself. In order to fix the amount of slippage so that it does not become excessive and wear out film, it is helpful to choose proper coil and hub sizes for a chosen film length and from that determine total slippage for each complete film cycle. For each successive layer of film, the circumference changes by a factor of $2t\pi$. If $t$ = 0.006 inches, slippage per revolution equals 0.0376991 inches per revolution. Total slippage equals $Do - Di/2t \times 2t\pi = \pi(Do - Di)$. For the 26 minute reel having the above-given diameters, total slippage is less than 24 inches throughout its length, a wear condition easily tolerable for continuous use for a considerable period of time. From the foregoing calculations it may be seen that for a given film length and a selected film slippage tolerance, one can calculate the proper coil and hub diameters.

While a particular embodiment of the present invention has been shown herein, it will be obvious that changes and modifications may be made without departing from this invention in its broader aspects. It is contemplated that the movable control arm 64 may be, in situations involving large diameter cartridges, substituted by a fixed arm, still establishing the proper angle of withdrawal of film from the center of the cartridge, whereby a movable control arm can be set up elsewhere in the section of film between the center of the coil and the first projector sprocket. Additionally, the manner in which the housing retains the film coil, permits an installation where the turntable need not be strictly horizontal. Further, other types of motor control circuits could be employed subject to the conditions and requirements of the motor control circuit hereinabove set forth.

I claim:

1. A system for handling an endless strip of material such as motin picture film for use with a film projector or the like, whereby the strip of material is to be disposed in a single coil having one continuous external section for engagement with the projector, the combination comprising:

a housing, a turntable mounted within said housing, said turntable comprising a disc providing a flat continuous surface, a hub member mounted upon said turntable, said hub extending upwardly from the surface of said turntable, an exit aperture in said housing near the center of said turntable, an entrance aperture in said housing near the edge thereof for the return of said external loop to said coil in said housing;

guide means mounted adjacent said housing, said guide means being spaced laterally and above said exit aperture, said guide means operative to guide said strip out of said housing at an acute angle with respect to the plane of said turntable;

drive means for rotating said turntable, said drive means comprising a continuously running motor, said motor having a motor shaft engaging said turntable;

control means coupled to said drive means, means responsive to the size of a loop formed in the strip of material between said exit aperture and a projector to which the strip extends, said responsive means being coupled to said control means, said control means including means for controlling the electrical signal to said motor for continuously varying the speed thereof in response to changes in said loop whereby said turntable is made to continuously rotate at varying speeds the minimum being greater than zero under normal operating conditions; and a layer of material deposited upon the surface of said turntable, said layer having a low coefficient of friction, said housing having a top cover plate, a plurality of strip-like members affixed to the underside of said cover plate disposed in a substantially radial fashion with respect to said turntable, means for adjustably positioning said strip-like members in a spaced-apart relationship with respect to said turntable surface so as to be capable of frictionally engaging the edges of said coil of said endless strip material when said material is so disposed upon said turntable surface.

2. The system set forth in claim 1 wherein said drive means is operative to drive said turntable at a rotational speed at all times in excess of the speed at which the strip of material is returned from the projector to the coil regardless of the speed of said projector.

3. The system set forth in claim 2 further including tension control means mounted adjacent said housing, said control means adapted to engage a portion of said external film section between said projector and said entrance aperture.

4. The system set forth in claim 3 wherein said control means comprises circuit means coupled to said motor, said circuit means comprising a half-wave phase control network coupled to said motor, said circuit including variable resistance means, said variable resistance means being mechanically coupled to said loop responsive means, said responsive means being operative to vary electrical resistance in said network to vary the speed of said motor.

5. The system set forth in claim 4 wherein said guide means comprises a roller guide mounted above said turntable and so positioned with respect to said exit aperture that said strip of material coming out of said exit aperture and passing over said roller guide defines a path having an angle of 35° to 55° with respect to the plane of said turntable.

6. A system for handling an endless strip of motion picture film, the system to be used in conjunction with a conventional film projector, the combination comprising:

a housing, a turntable mounted within said housing, said turntable comprising a disc providing a flat continuous surface, a hub member affixed to said turntable and rotatable therewith, said hub extending upwardly from the surface of said turntable, an exit aperture in said housing near the center of said turntable, an entrance aperture near an edge of said housing, a coil of film disposed upon said turntable, said coil of film having a section thereof extending externally of said housing coming out of the inner convolution thereof through said exit aperture and returning at said entrance aperture joining the outer periphery of said coil;

guide means mounted adjacent said housing, said guide means being spaced laterally and above said exit aperture, said guide means engaging said external section of film to guide the same out of said exit aperture at an acute angle with respect to the plane of said turntable;

drive means for rotating said turntable, said drive means comprising a continuously running motor, said motor having a motor shaft frictionally engaging said turntable;

control means coupled to said drive means, means responsive to the size of a loop of film formed between said exit aperture and the projector to which the film is to be coupled, said responsive means being coupled to said control means, said control means including means for controlling the electrical signal to said motor for continuously varying the speed thereof in response to changes in the size of said loop whereby said turntable is made to rotate at varying speeds the minimum of which is greater than zero under normal operating conditions; and a layer material deposited upon the surface of said turntable, said layer having a low coefficient of friction, said housing having a top cover plate, a plurality of strip-like members affixed to the underside of said cover plate disposed in substantially radial fashion with respect to said turntable, means for adjustably positioning said cover plate in a spacedapart position above said turntable surface whereby said strip-like members frictionally engage the edges of said film coil.

7. The system set forth in claim 6 wherein said drive means drives said turntable at a rotational speed which is at all times greater than the rotational speed of said film coil thereon regardless of the speed of said projector.

8. The system set forth in claim 7 further including tension control means mounted adjacent said housing, said control means adapted to engage a portion of said external film section between said projector and said entrance aperture.

9. The system set forth in claim 7 wherein said control means comprises circuit means coupled to said motor, said circuit means comprising a half-wave phase control network coupled to said motor, said circuit including variable resistance means, said variable resistance means being mechanically coupled to said loop responsive means, said responsive means being operative to vary electrical resistance in said network to vary the speed of said motor.

10. The system set forth in claim 9 wherein said guide means comprises a roller guide mounted above said turntable and so positioned with respect to said exit aperture such that said strip of material coming out of said exit aperture and passing over said roller guide defines a path having an angle of 35° to 55° with respect to the plane of said turntable.

11. The system set forth in claim 8 wherein said coil of film is loosely disposed upon said turntable and consecutive convolutions thereof are not of uniformly progressive diameter, there being one or more gaps existing between some of the convolutions.

12. The system set forth in claim 9 wherein said guide means is mounted upon said loop responsive means, said guide means comprising a roller guide positioned above said turntable and engaging said film loop, said roller guide being thereby movable with said loop responsive means such that the film coming out of said exit aperture and passing over said roller guide defines a path having an angle which varies between 35° and 55° with respect to the plane of said turntable as said loop varies during operation of the system.

13. The system set forth in claim 8 wherein said responsive means comprises a control arm, one end of said arm having means thereon engaging a section of said film at a location between said exit aperture and the aforesaid projector, the other end of said arm being pivotally mounted adjacent said housing, the pivotal end of said arm being mechanically coupled to the wiper shaft of a potentiometer, said control means comprising electrical circuit means coupled to said motor, said potentiometer being electrically coupled in said circuit means whereby movement of said arm in response to changes in tension in said film loop varies the operation of said circuit means to control the speed of said motor.

14. The system set forth in claim 13 wherein said circuit means comprises a half-wave phase control network including a silicon controlled rectifier coupled in series with said motor, said potentiometer being coupled to the gate electrode of said rectifier.

* * * * *